United States Patent [19]
Tabata et al.

[11] Patent Number: 6,065,322
[45] Date of Patent: May 23, 2000

[54] METHOD AND DEVICE FOR FORMING BLANKS FOR BEARING RINGS

[75] Inventors: Yutaka Tabata; Kiyoshi Uemoto, both of Wakayama, Japan

[73] Assignee: NTN Corporation, Osaka, Japan

[21] Appl. No.: 09/260,060

[22] Filed: Mar. 2, 1999

[30] Foreign Application Priority Data

| Mar. 4, 1998 | [JP] | Japan | 10-051673 |
| Mar. 4, 1998 | [JP] | Japan | 10-052025 |
| Mar. 4, 1998 | [JP] | Japan | 10-052055 |
| Mar. 4, 1998 | [JP] | Japan | 10-052095 |
| Mar. 4, 1998 | [JP] | Japan | 10-052100 |

[51] Int. Cl.$^7$ .................................................. B21K 1/04
[52] U.S. Cl. .......................... 72/334; 72/358; 29/898.057; 29/898.066
[58] Field of Search ............................ 72/334, 335, 356, 72/358; 29/898.057, 898.066

[56] References Cited

U.S. PATENT DOCUMENTS

| 3,378,903 | 4/1968 | Cardillo | 29/148.4 |
| 3,399,560 | 9/1968 | Connolly et al. | 72/368 |
| 3,670,285 | 6/1972 | English | 338/175 |
| 3,737,965 | 6/1973 | Knapp | 29/148.4 |
| 3,998,505 | 12/1976 | Frost et al. | 308/195 |
| 4,393,563 | 7/1983 | Smith | 29/149.5 |
| 4,393,681 | 7/1983 | Sakai | 72/329 |
| 4,580,431 | 4/1986 | Oku et al. | 72/334 |
| 4,963,041 | 10/1990 | Sowards | 384/493 |
| 5,209,636 | 5/1993 | Fannar | 415/174.4 |
| 5,910,052 | 6/1999 | Ellis et al. | 470/6 |

*Primary Examiner*—Joseph J. Hail, III
*Assistant Examiner*—William Hong
*Attorney, Agent, or Firm*—Wenderoth, Lind & Ponack, L.L.P.

[57] ABSTRACT

A separating/punching device is provided which can simultaneously separate an outer and inner cylindrical portion of a cylindrical piece from each other and remove a bottom from the inner cylindrical portion by punching as a single step. A fixed die assembly includes a die having a setting hole, and a tubular fixed punch for separation having its tip inserted in the setting hole of the die. A movable die assembly movable toward and away from the fixed die assembly includes a tubular movable punch for separation which can fit around the tip of the fixed punch, and a punch mounted coaxially in the movable punch for punching out the bottom of the cylindrical piece. With the cylindrical piece set in the setting hole so that the tip of the fixed punch is inserted in the outer cylindrical portion of the cylindrical piece, the movable die assembly is moved toward the fixed die assembly to separate the outer and inner cylindrical portion from each other with the fixed punch and the movable punch and simultaneously remove the bottom of the inner cylindrical portion with the punch.

23 Claims, 8 Drawing Sheets

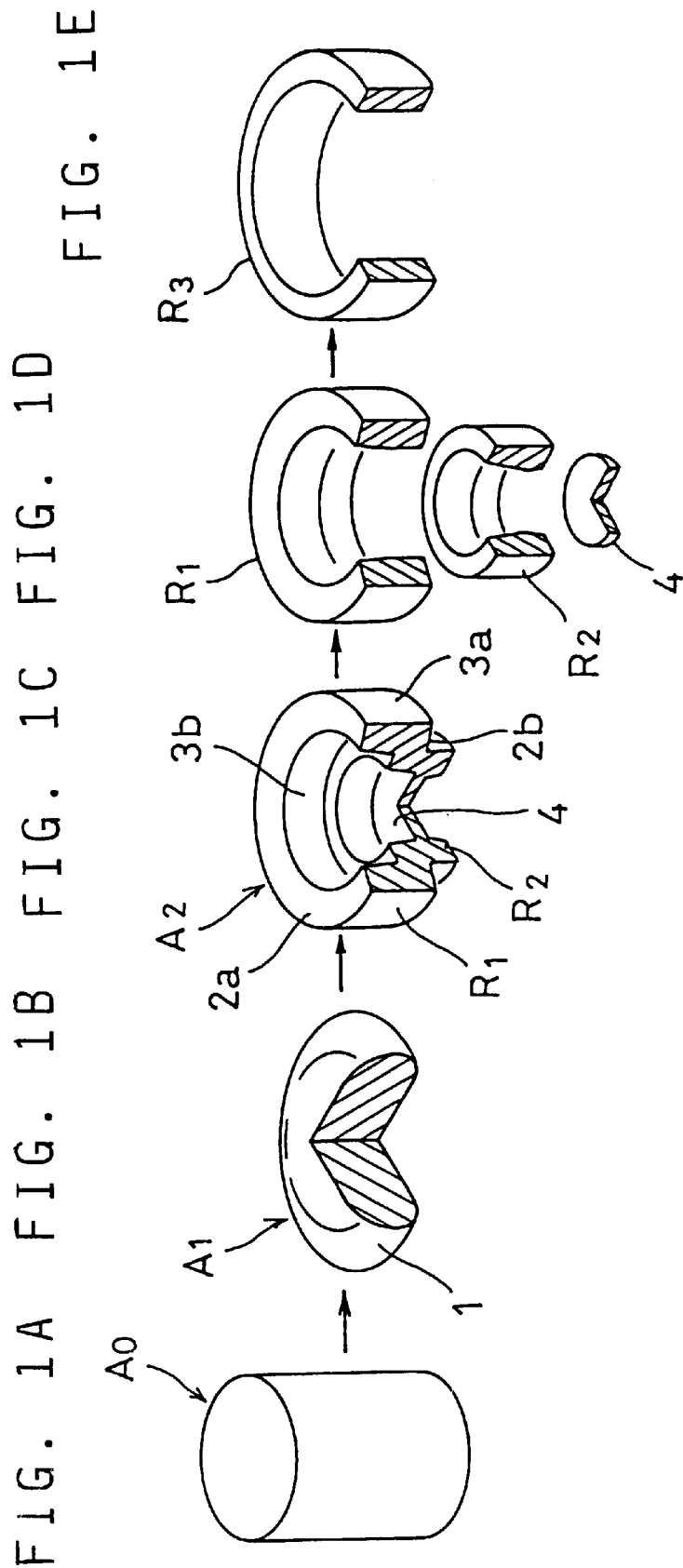

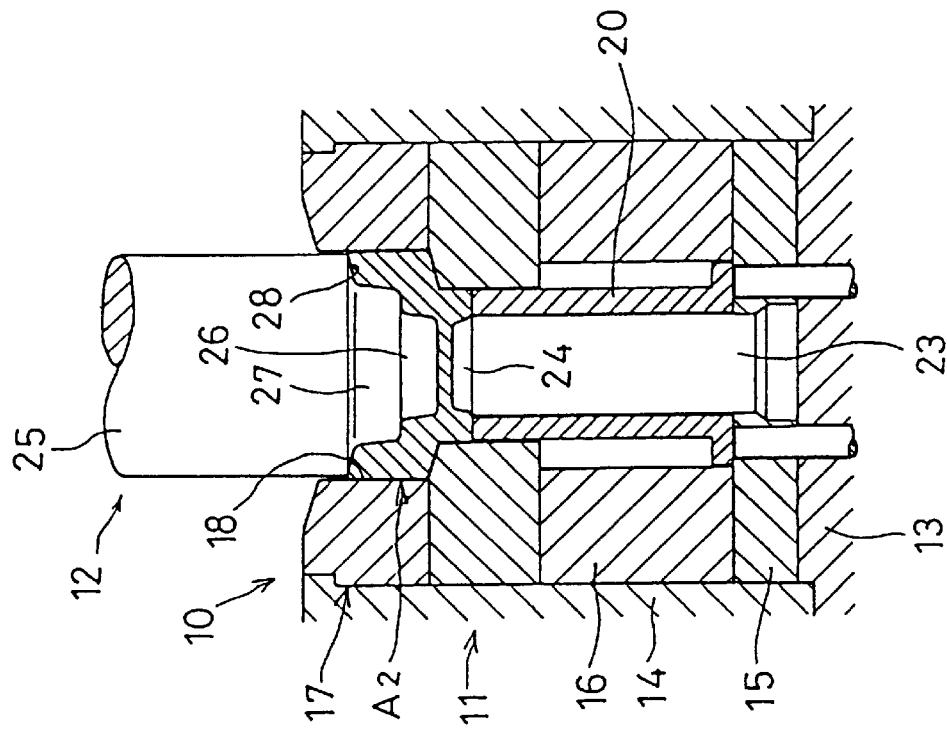
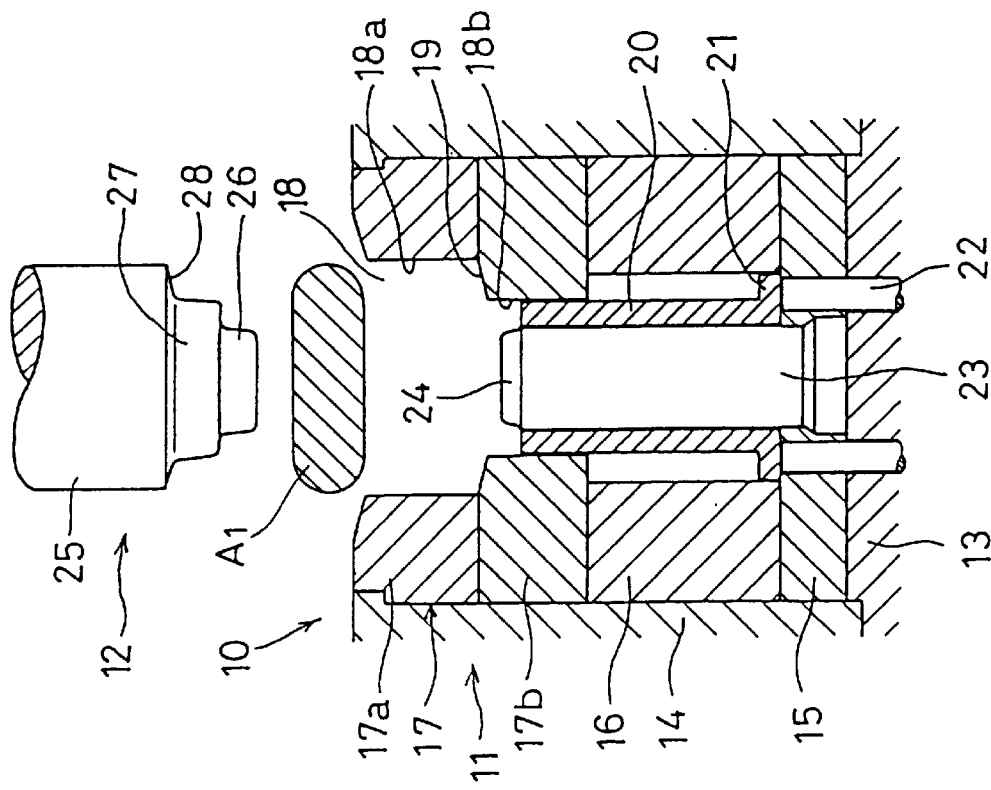

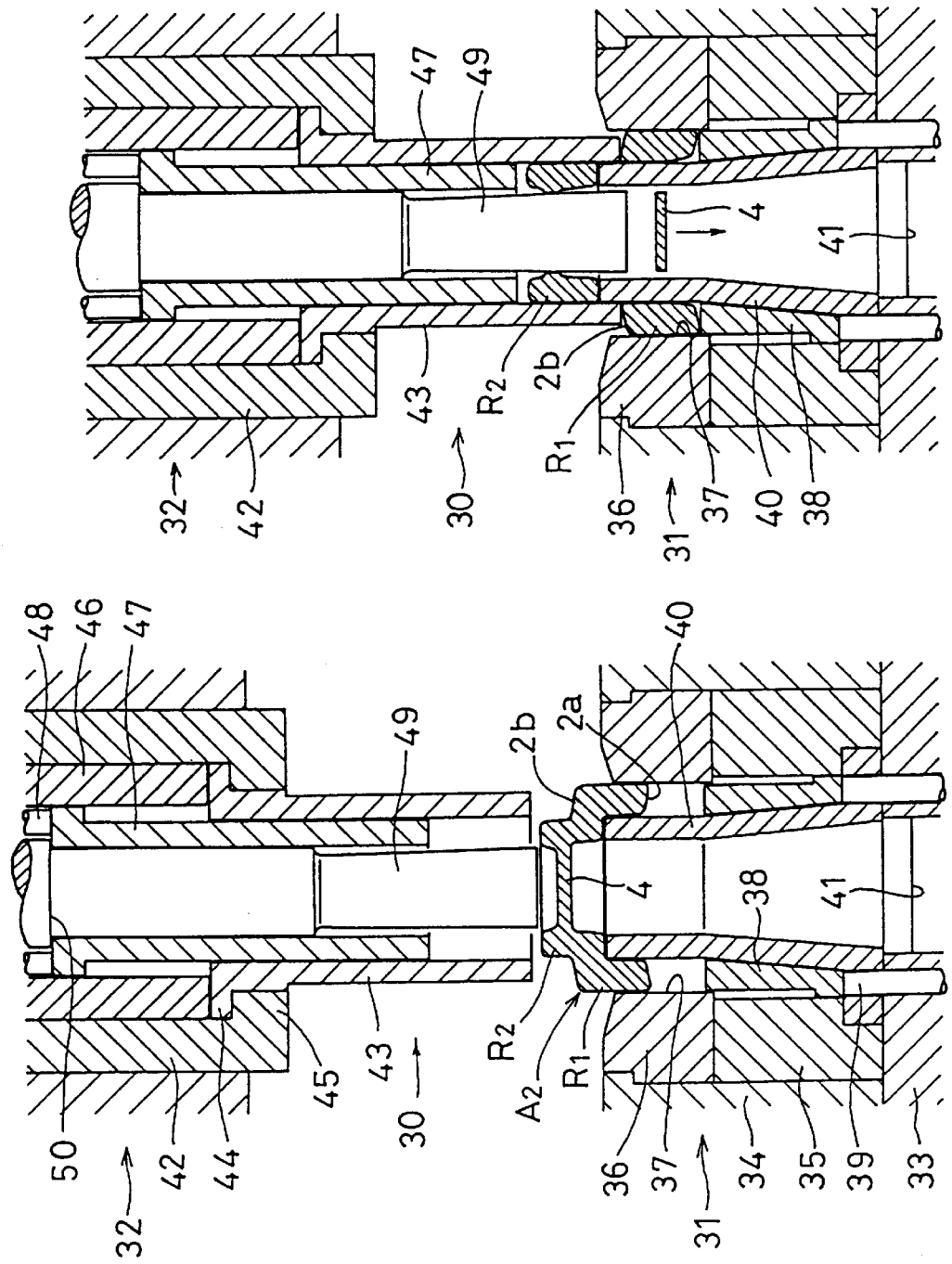

METHOD AND DEVICE FOR FORMING BLANKS FOR BEARING RINGS

BACKGROUND OF THE INVENTION

This invention relates to a method and a device for manufacturing bearing blanks, and more particularly for forming two blanks (for outer and inner bearing rings) from a single material.

FIG. 8 shows a conventional method for forming bearing blanks to be formed into outer and inner rings of a bearing from a single material. This method (consists of the following five steps.

First Step: A columnar piece B0 shown in FIG. 8A is hot swaged axially to form a disk-shaped piece B1 having an arcuate outer periphery 101 as shown in FIG. 8B.

Second Step: The disk-shaped piece B1 is formed into a stepped cylindrical piece B2 shown in FIG. 8C by die forging. The piece B2 comprises an outer cylindrical portion 102 and an inner cylindrical portion 103 having its top end integrally joined to the inner surface of the outer cylindrical portion 102. The inner cylindrical portion 103 has an inner bottom 104.

Third Step: The outer cylindrical portion 102 and the inner cylindrical portion 103 having the bottom are separated from each other as shown in FIG. 8D by shearing the cylindrical piece B2 axially along the chain line of FIG. 8C.

Fourth Step: The bottom 104 of the inner cylindrical portion 103 is removed by a punch to form a blank 106 for an inner bearing ring (FIG. 8E).

Fifth Step: The outer cylindrical portion 102 is subjected to rolling to increase its diameter and form an annular groove in the inner surface, thus forming a blank 107 for an outer bearing ring shown in FIG. 8F.

The first to fourth steps are hot processes continuously carried out by a forging machine. Then, the outer cylindrical portion 102 and the inner cylindrical portion 103 are taken out of the forging machine. The fifth step, a diameter-increasing step, is carried out in the cold by a roll former shown in FIG. 9.

The roll former comprises main rollers 110 each having a groove and a mandrel 111 having an annular rib 112. By rotating the main rollers 110 with the outer cylindrical portion 102 pressed against one of the main rollers 110 by the mandrel 111, the cylindrical portion is diametrically expanded gradually. At the same time, an annular groove 108 is formed in the inner periphery thereof.

The outer cylindrical portion 102 has a shoulder 105 formed on its inner periphery. The shoulder 105 is inevitably formed when the cylindrical piece B2 is separated axially into the outer and inner portions in the third step. Thus, if the outer cylindrical portion 102 has no shoulder on its outer periphery, this means that there is a difference in thickness at both ends of the outer cylindrical portion 102. Such a difference in thickness at both ends will make it difficult to form an intended blank 107 for an outer bearing ring by rolling.

In order to avoid such a difference in thickness at both ends and to form a high-quality outer ring blank by rolling, it is necessary to form a shoulder 109 on the outer periphery of the outer cylindrical portion during die forging in the second step.

The blank 106 for an inner bearing ring formed in the fourth step, and the blank 107 for an outer bearing ring formed in the fourth step are formed into an inner ring 7b and an outer ring 7a of a ball bearing 7 shown in FIG. 10 by lathing, cutting, heat treatment, etc.

In the conventional method of manufacturing bearing ring blanks shown in FIG. 8, in addition to the multistage feed type forging machine for carrying out the first to fourth steps, a roll former for cold roll forming in the fifth step is separately needed. Therefore, the facility cost tends to be high.

Further, the step of separating the cylindrical piece B2 into the outer cylindrical portion 102 and the inner cylindrical portion 103 having the bottom (Third Step) and the step of punching the bottom 104 from the inner cylindrical portion 103 (Fourth Step) are separate steps. Thus, a large number of steps are needed to manufacture an outer bearing ring blank. Also, since the roll forming in the fifth step is carried out in the cold, productivity is low.

An object of this invention is to provide a separating/punching method and device which can improve productivity of bearing blanks and which makes it possible to manufacture blanks for inner and outer bearing rings with a single multistage forging machine.

SUMMARY OF THE INVENTION

According to this invention, there is provided a method of forming blanks for bearing rings comprising a separating/punching step for cutting a cylindrical article comprising an outer cylindrical portion and an inner cylindrical portion having a bottom and having one end thereof integrally joined to the outer cylindrical portion. The cylindrical article is cut along the boundary between the inner and outer cylidrical portions to separate the inner and outer cylindrical portions from each other. Simultaneously, the bottom of the inner cylindrical portion is punched to form the inner cylindrical portion into a blank for an inner bearing. A diameter-increasing step for diametrically expanding the separated outer cylindrical portion to form a blank for an outer bearing ring is also performed. The separating/punching step and the diameter-increasing step are carried out continuously in a hot state.

If the outer cylindrical portion has a step on its outer periphery, the step might remain after it has been expanded to increase its outer diameter. Thus, its outer periphery should have a uniform diameter over its entire axial length. Also, because its axial ends may get tapered as a result of expansion, the outer cylindrical portion should have both its ends tapered in the opposite direction before expansion.

There is also provided a device for manufacturing blanks for bearing rings comprising a separating/punching component for cutting a heated cylindrical article comprising an outer cylindrical portion and an inner cylindrical portion having a bottom and having one end thereof integrally joined to the outer cylindrical portion. The separating/punching component cuts the heated cylindrical article the boundary between the inner and outer cylindrical portions to separate the inner and outer cylindrical portions from each other. Simultaneously, the separating/punching device removes the bottom of the inner cylindrical portion to form the inner cylindrical portion into a blank for an inner bearing. The manufacturing device also comprises a diameter-increasing component for diametrically expanding the thus separated and heated outer cylindrical portion to form a blank for an outer bearing ring.

Other features and objects of the present invention will become apparent from the following description made with reference to the accompanying drawings, in which:

BRIEF DESCRIPTION OF THE DRAWINGS

FIGS. 1A to 1E are perspective views showing, in a stepwise manner, pieces formed by the manufacturing method of bearing blanks according to this invention;

FIG. 2A is a sectional view of a forming device;

FIG. 2B is a sectional view showing how the forming is performed;

FIG. 3A is a sectional view of the separating/punching device;

FIG. 3B is a sectional view showing how separated and punched;

DETAILED DESCRIPTION OF THE PREFERRED EMBODIMENT

Figure 4A:
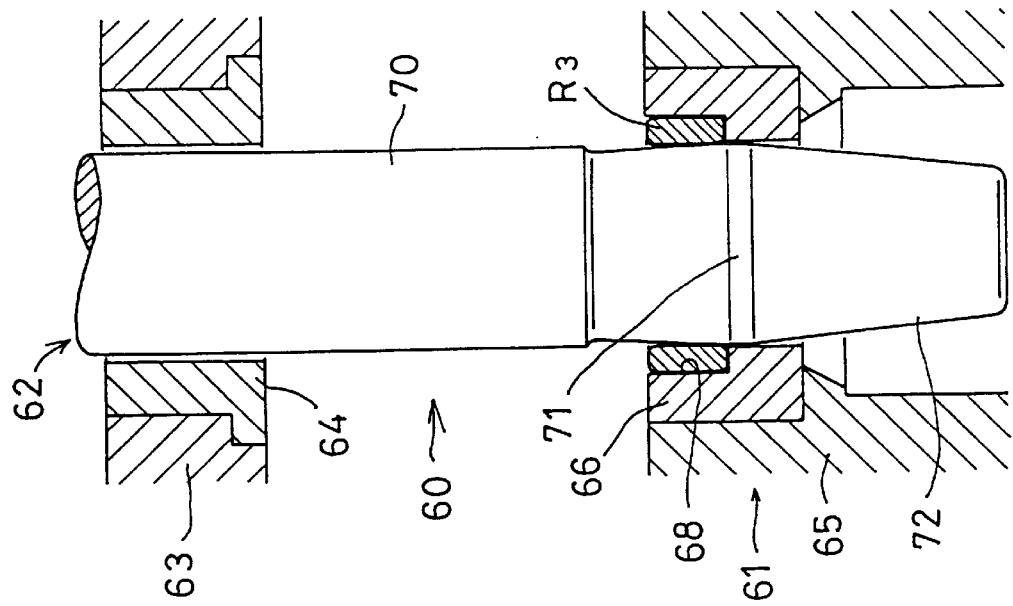
FIG. 4A is a sectional view of a diameter expander.

An embodiment of this invention will now be described with reference to FIGS. 1 to 7.

FIG. 1 shows how blanks for bearing rings are formed by the method according to this invention. A columnar piece A0 shown in FIG. 1A is made of a hard material such as high-carbon chromium bearing steel, case-hardened steel or steel for mechanical structure. The columnar piece A0 is hot swaged axially in the first step to form a disk-shaped piece A1 having an arcuate outer periphery 1 as shown in FIG. 1B.

The disk-shaped piece A1 is subjected to die forging in the second step. FIG. 2 shows a forming device 10 used for die forging. The forming device 10 comprises a fixed die assembly 11 and a movable die assembly 12.

The fixed die assembly 11 has a fixed base 13 to which is fixed a die holder 14 for supporting a backing plate 15 which in turn supports a guide cylinder 16 on which is supported a die 17.

The die 17 has a stepped hole 18. In order that the stepped hole 18 can be formed easily, the die 17 is composed of a first die portion 17a and a second die portion 17b.

The stepped hole 18 comprises a large-diameter portion 18a, a small-diameter portion 18b and a shoulder portion 19 provided between the large- and small-diameter portions and tapered toward the small-diameter portion 18b. A knockout sleeve 20 has its tip inserted in the small-diameter portion 18b.

At its rear end, the sleeve 20 has a flange 21 which is slidably supported along the inner periphery of the guide cylinder 16. The sleeve 20 is moved axially by a knockout pin 22 abutting the rear end of the flange 21. When the sleeve 20 is in its rearmost position, where its rear end abuts the surface of the backing plate 15, its front end is located slightly below the tapered shoulder 19.

A lower punch 23 having a recess-forming protrusion 24 at its tip is inserted in the sleeve 20. When the sleeve 20 is in its rearmost position, the protrusion 24 protrudes from the front end of the sleeve 20 into the small-diameter portion 18b of the hole 18.

The movable die assembly 12 has an upper punch 25 arranged so as to be coaxial with the die 17. The punch 25 has a second protrusion 27 and a first protrusion 26 formed on the end face of the second protrusion 27 and having a smaller diameter than the second protrusion 27. Each protrusion 26, 27 has a draft on its outer periphery. A shoulder 28 is formed at the root of the second protrusion 27 so as to be tapered in the same direction as the shoulder 19 of the die 17.

The disk-shaped piece A1 shown in FIG. 1F is set on the front side of the die 17 as shown in FIG. 2A and hot-formed while moving the movable die assembly 12 toward the fixed die assembly 11.

FIG. 2B shows how the forming is performed. The stepped hole 18 of the die 17 shapes the outer periphery of the disk-shaped piece A1, while the protrusion 24 of the lower punch 23 of the fixed die assembly 11 and the first and second protrusions 26, 27 of the upper punch 25 of the movable die assembly 12 shapes the inner periphery of the piece A1. A stepped cylindrical piece A2 is thus formed.

The cylindrical piece A2 is removed from the die 17 by backing the movable die assembly 12 and then axially moving the sleeve 20.

FIG. 1C shows the cylindrical piece A2 as removed from the forming device 10. The piece A2 comprises an outer cylindrical portion R1, and an inner cylindrical portion R2 axially offset from the outer cylindrical portion R1 and protruding from one end of the outer cylindrical portion R1. The outer cylindrical portion R2 has both end faces 2a, 2b tapered in the same direction. Also, the outer cylindrical portion R1 has a cylindrical outer periphery 3a having a uniform diameter over the entire axial length thereof, and an inner periphery 3b tapered at the same angle as the draft of the punch 25.

The inner cylindrical portion R2 has substantially the same outer diameter as the inner diameter of the outer cylindrical portion at its small-diameter end (inner end), and has a bottom 4.

The cylindrical piece A2 is set in a separating/punching device 30 shown in FIG. 3 for separating the outer and inner cylindrical portions R1, R2 from each other and simultaneously punching the bottom 4 from the inner cylindrical portion R2 in a hot environment.

The separating/punching device 30 comprises a fixed die assembly 31 and a movable die assembly 32. The fixed die assembly 31 has a fixed base 33 to which is fixed a die holder 34 supporting a guide cylinder 35 on which is supported a die 36.

The die 36 has a setting hole 37 having such an inner diameter that the outer cylindrical portion R1 of the cylindrical piece A2 fits tightly.

A knockout sleeve 38 is axially slidably inserted in the guide cylinder 35. The sleeve 38 is pushed axially by a knockout pin 39 abutting its rear end face to push the outer cylindrical portion R1 remaining in the setting hole 37 out of the die 36.

A fixed punch 40 for separation is inserted in the sleeve 38 and axially immovably supported by the guide cylinder 35 with its tip substantially at the same position as the surface of the die 36. The outer diameter of the fixed punch 40 at its tip is such that the tip of the punch is inserted tightly into the outer cylindrical portion R1 of the cylindrical piece A2. Also, the punch 40 has an inner diameter greater than the inner diameter of the inner cylindrical portion R2 of the cylindrical piece A2 so as to guide the bottom 4 punched out of the inner cylindrical portion R2 into a scrap discharge hole 41.

The movable die assembly 32 includes a tubular punch holder 42 in which is inserted the rear end of a tubular movable punch 43 for separation. The movable punch 43 has a flange 44 at its rear end. Axial movement of the flange 44 is prevented by a flange 45 provided at the front end of the punch holder 42 and the front end of a guide cylinder 46 mounted in the punch holder 42.

The movable punch 43 is held coaxial with the fixed punch 40 of the fixed die assembly 31. The movable punch 43 has an outer diameter smaller than the inner diameter of the hole 37 of the die 36 of the fixed die assembly 31, and has an inner diameter substantially equal to the outer diameter of the fixed punch 40 of the fixed die assembly 31. Therefore, when the movable die assembly 32 is advanced, its tip fits around the tip of the fixed punch 40.

A knockout sleeve 47 has its rear end inserted in the guide cylinder 46 and its front end slidably inserted in the movable punch 43. The sleeve 47 is advanced by a knockout pin 48 abutting its rear end to push out the inner cylindrical portion R2 remaining in the movable punch 43 to its front end.

An inner punch 49 is axially immovably inserted in the sleeve 47 with its front end located at substantially the same position as the front end of the movable punch 43. The outer diameter of the inner punch 49 at its tip is substantially equal to the inner diameter of the inner cylindrical portion R2 of the cylindrical piece A2. The punch 49 has on its outer surface a shoulder 50 that limits the backward stroke of the sleeve 47.

The cylindrical piece A2 is set so that the end of the outer cylindrical portion R1 fits in the space between the die 36 and the front end of the fixed punch 40.

In this state, when the movable die assembly 32 is moved toward the fixed die assembly 31, the end face 2b of the outer cylindrical portion R1 is pressed axially by the movable punch 43 of the movable die assembly 32. The outer cylindrical portion R1 is thus separated from the inner cylindrical portion R2 by the movable punch 43 and the fixed punch 40 as shown in FIG. 3B, and pushed into the setting hole 37 of the die 36.

Immediately before the outer and inner cylindrical portions R1 and R2 are separated from each other, the bottom 4 of the inner cylindrical portion R2 is punched out by the punch 49 and pushed into the fixed punch 40. The bottom 4 in the punch 40 is then pushed by the succeeding bottoms 4 pushed one after another into the punch and discharged through the scrap discharge hole 41.

On the other hand, the separated inner cylindrical portion R2 is removed from below by retracting the movable die assembly 32, and is used as a blank for an inner bearing ring. The outer cylindrical portion R1, which remains in the setting hole 37 of the die 36, is taken out of the die by advancing the sleeve 38.

FIG. 1D shows the outer cylindrical portion R1, inner cylindrical portion R2 and bottom 4 taken out of the separating/punching device 30. The outer cylindrical portion R1 is hot-expanded diametrically by an expander 60 shown in FIG. 4.

The expander 60 comprises a fixed die assembly 61 and a movable die assembly 62. A stripper plate 63 is held in a fixed position between the assemblies 61 and 62. The stripper plate 63 carries a tubular stripper 64.

The fixed die assembly 61 has a die holder 65 having a hole 66 in which is mounted a die 67. The die 67 has a forming hole 68 for limiting the amount of diametrical expansion of the outer cylindrical portion R1. The hole 68 has a bottom formed with a punch inserting hole 69 having a smaller diameter than the forming hole 68. The forming hole 68 has a diameter equal to the outer diameter of the outer ring blank to be obtained.

The movable die assembly 62 has a forming punch 70 provided coaxial with respect to the die 67 and inserted in the stripper 64.

The punch 70 comprises a straight portion 71 and a tapered portion 72 at the front end of the straight portion 71. The straight portion 71 has a diameter equal to the inner diameter of the intended outer ring blank.

Figure 4B:
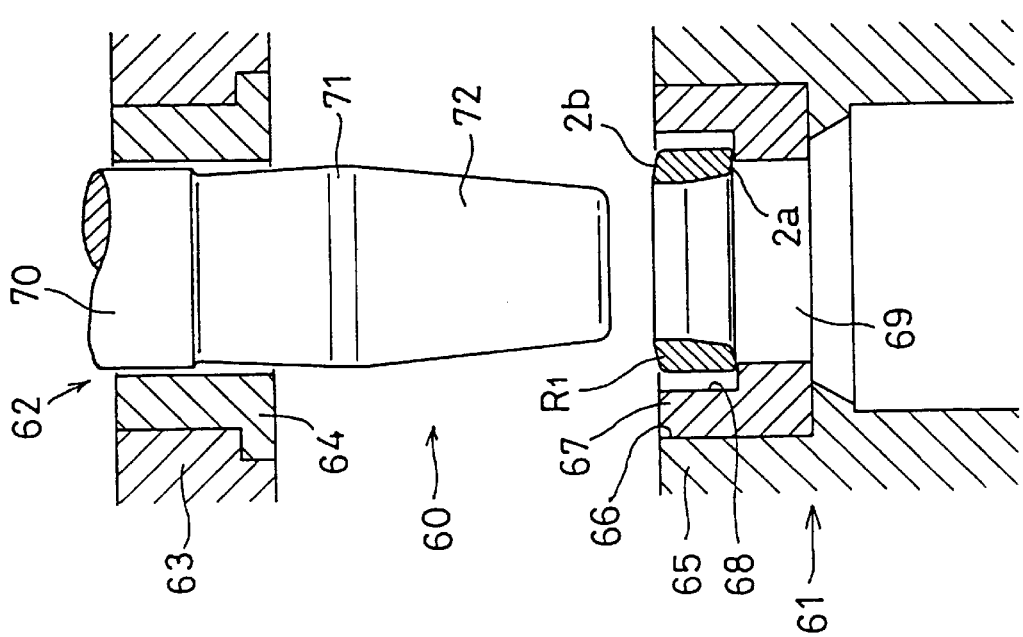
FIG. 4B is a sectional view showing how expanded.

The outer cylindrical portion R1 is set in the forming hole 68 of the die 67 as shown in FIG. 4A. In this state, when the movable die assembly 62 is moved toward the fixed die assembly 61, the tapered portion 72 of the punch 70 penetrates into the outer cylindrical portion R1, thus expanding it and increasing its diameter by ironing its inner surface. The punch 70 advances until the straight portion 71 is fully inserted into the outer cylindrical portion R1. The inner diameter of the outer cylindrical portion R1 thus increases to a predetermined value. Since the amount of diametric expansion is limited by the forming hole 68 of the die 67, the outer diameter increases to a predetermined value. An outer ring blank R3 is thus formed as shown in FIG. 4B.

By retracting the movable die assembly 62, the outer ring blank R3 is moved back together with the assembly 62. When the punch 70 retracts until it comes out of the stripper 64, the blank R3 abuts the stripper 64 and is discharged from the punch 70 by the stripper. FIG. 1E shows the blank R3 thus discharged.

While the outer cylindrical portion R1 is being expanded by the punch 70, its inner peripheral portion tends to be deformed axially by contact with the punch 70. Thus, if the outer cylindrical portion R1 had flat end faces, the end faces might be deformed into tapered surfaces by the time the outer cylindrical portion is expanded to a predetermined diameter suitable as a blank R3 for an outer bearing ring.

But according to the invention, since the end faces 2a, 2b of the outer cylindrical portion R1 are tapered in opposite directions beforehand by the forming device 10 shown in FIG. 2, such tapered surfaces are deformed into flat surfaces by the time the outer cylindrical portion R1 is expanded diametrically to a predetermined amount. Thus, it is possible to form an outer ring blank R3 having end faces highly parallel.

In the embodiment, for convenience of description, the forming device 10, separating/punching device 30 and expander 60 were described separately. But actually, the fixed die assemblies 11, 31 and 61 of the respective devices 10, 30, 60 are supported on a fixed block of a multistage forging machine, while the movable die assemblies 12, 32, 62 are supported on a common press slide so as to be movable together simultaneously. The swaged disk-shaped piece A1 is thus fed continuously into the forming device 10, separating/punching device 30 and expander 60 one after another for forming, separation and punching, and diameter expansion. When the piece A2 is fed from the forming device 10 into the separating/punching device 30, it is turned upside down so that the positions of the outer and inner cylindrical portions R1 and R2 are reversed.

It is thus possible to manufacture blanks R2, R3 for inner and outer bearing rings with extremely high efficiency. The arrangement of the invention is also economically advantageous because no roll former for cold rolling as described in the prior art section is needed.

Although it is impossible to form a groove while manufacturing a blank for an outer bearing ring, such a groove can be formed easily in the subsequent cutting step because the machining amount in the groove forming is small. As a whole, productivity improves.

Figure 5A:
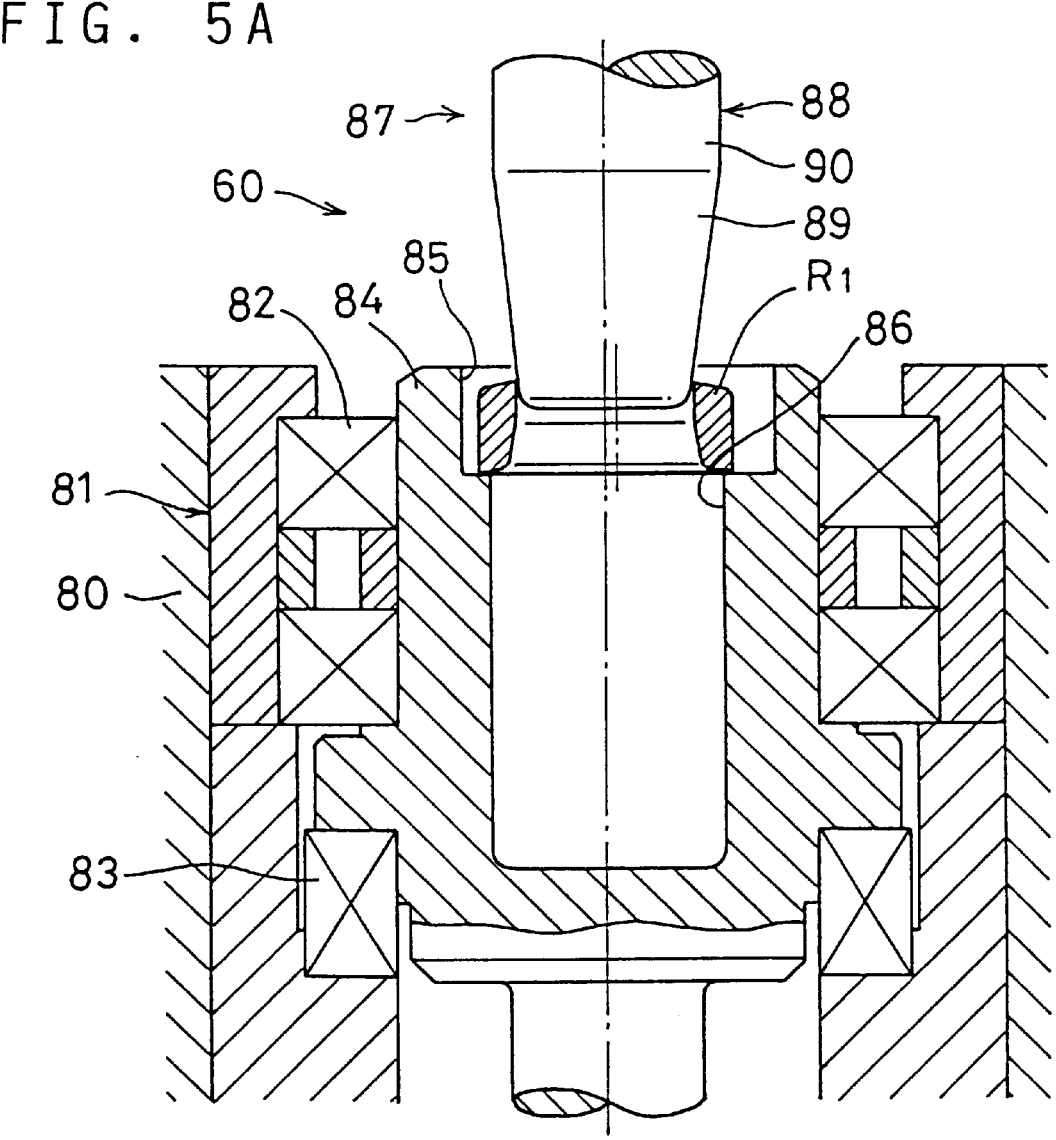
FIG. 5A is a sectional view of another embodiment of diameter expander.
Figure 5B:
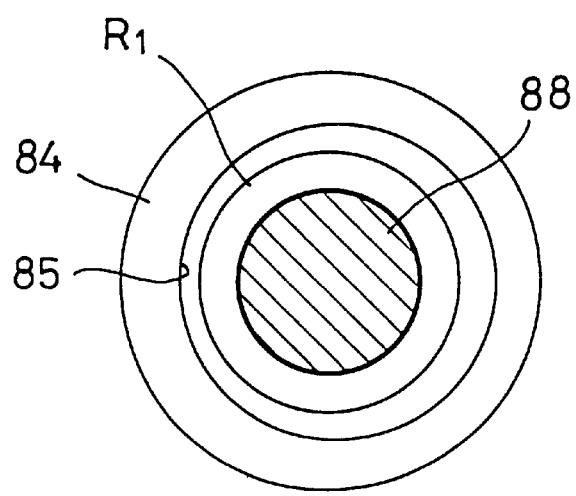
FIG. 5B is a cross-sectional plan view of FIG. 5A.

FIG. 5 shows another embodiment of diameter expander 60. This expander 60 has a holder 80 supporting a bearing housing 81 in which are mounted a radial bearing 82 and a thrust bearing 83 which rotatably support a rotary shaft 84 having an eccentric hole 85 having a bottom formed with a punch inserting hole 86. On the other hand, a movable die assembly 87 has a forming punch 88 rotatable about the axis of the rotary shaft 84.

To diametrically expand the outer cylindrical portion R1, with the portion R1 set in the eccentric hole 85, the rotary shaft 84 is rotated, and simultaneously, the tapered portion 89 of the punch 88 is inserted into the outer cylindrical portion R1 to rotate the outer cylindrical portion R1 and the punch 88 together with the rotary shaft 84. With the outer cylindrical portion R1 in rotation, the punch 88 penetrates gradually into the cylindrical portion R1 to diametrically expand it with the tapered portion 89 first and then with the straight portion 90.

Since the outer cylindrical portion R1 is diametrically expanded by the punch 88 while keeping the cylindrical portion R1 in rotation, it can be expanded smoothly with no undue force applied thereto. Thus, the outer cylindrical portion R1 is less likely to crack.

Figure 6A:
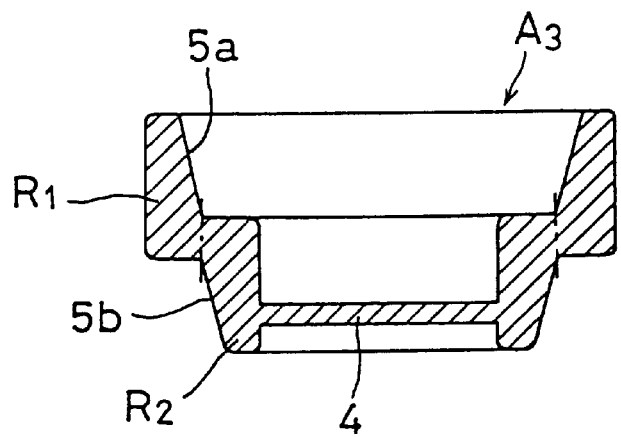
FIG. 6A is a sectional view of a different stepped cylindrical piece.
Figure 6B:
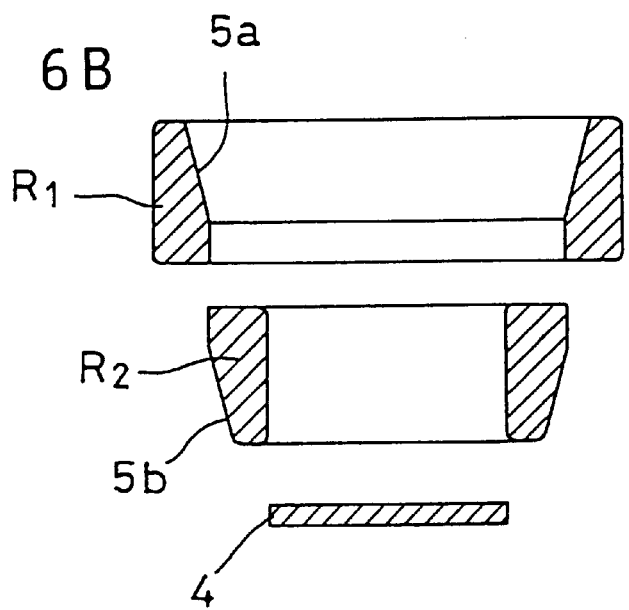
FIG. 6B is a sectional view showing the separated cylindrical piece.
Figure 7:
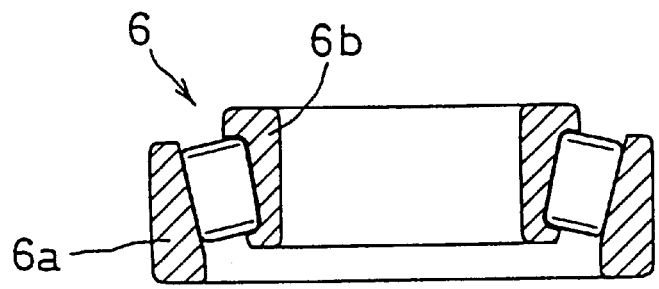
FIG. 7 is a sectional view of a tapered roller bearing.
Figure 8:
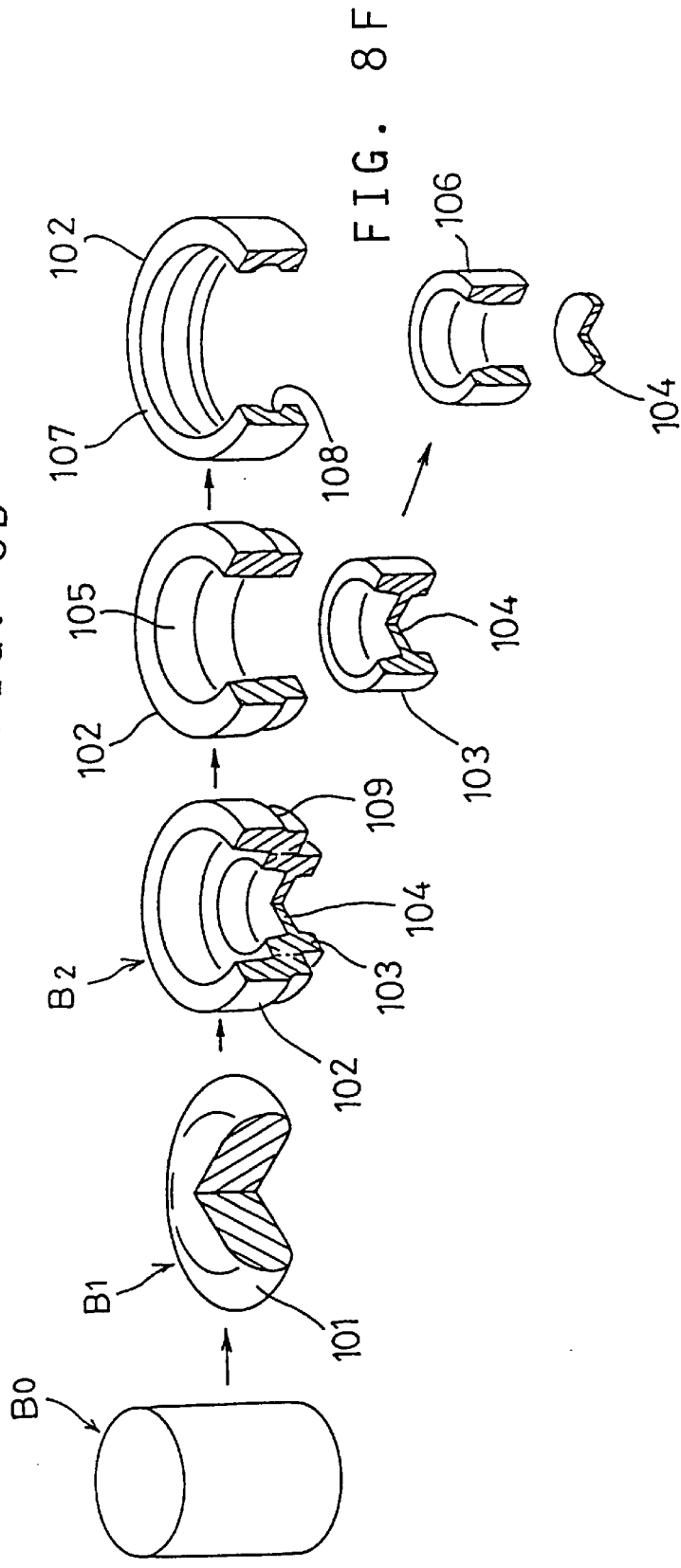
FIGS. 8A to 8F are perspective views showing, in a stepwise manner, pieces formed by a conventional manufacturing method for bearing blanks.
Figure 9:
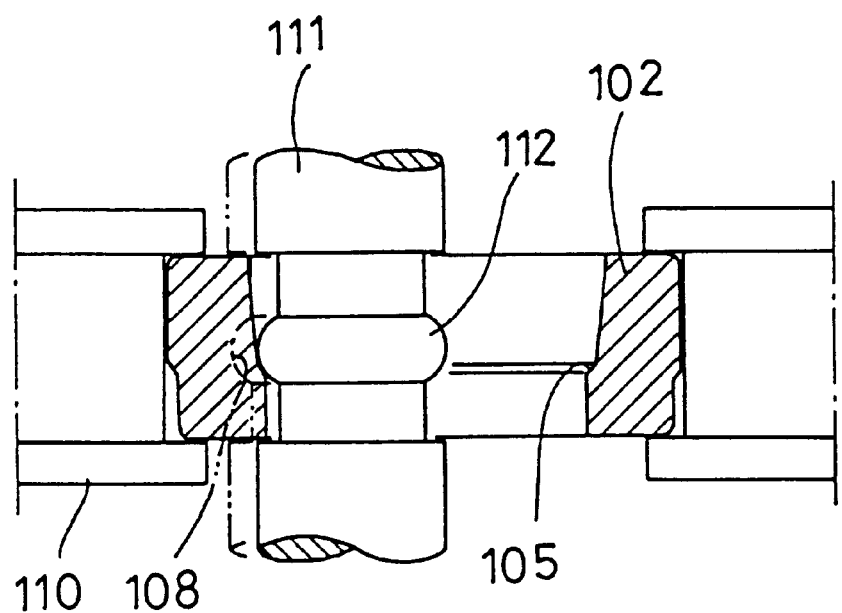
FIG. 9 is plan view of a roll former.
Figure 10:
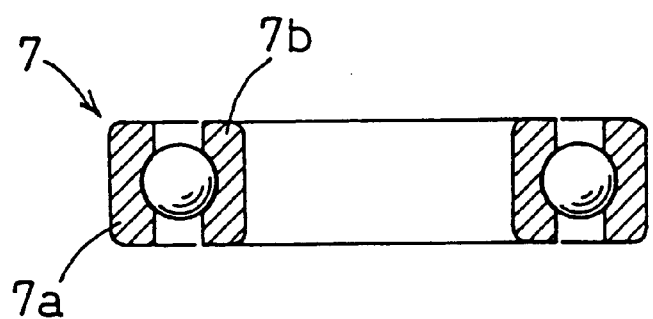
FIG. 10 is a sectional view of a ball bearing.

In the forming device 10 of FIG. 2, the surface of the small-diameter portion 18b of the stepped hole 18 formed in the die 17 is tapered in the same direction as the outer surface of the second protrusion 27 formed on the punch 25. Thus, as shown in FIG. 6A, the outer and inner cylindrical portions R1, R2 of the stepped cylindrical piece A3 formed by this device have inner and outer surfaces 5a and 5b tapered in the same direction. The cylindrical piece A3 is sheared along chain line of FIG. 6A, and the bottom 4 is simultaneously punched from the inner cylindrical portion R2 by the separating/punching device of FIG. 3. The thus separated outer and inner cylindrical portions R1 and R2 are shown in FIG. 6B. As shown, they have tapered inner and outer surfaces 5a and 5b, respectively. The inner cylindrical portion R2 is used as a blank for an inner ring 6b of a tapered roller bearing 6 shown in FIG. 7.

The outer cylindrical portion R1 is diametrically expanded for use as a blank for an outer ring 6a of the tapered roller bearing 6.

The outer cylindrical portion R1 is diametrically expanded by pressing the tapered tip of the punch 70 or 88 of the movable die assembly 62 of the expander 60 shown in FIGS. 4 or 5.

As described above, according to this invention, during the separting/punching step of a cylindrical article, separation of the outer and inner cylindrical portions and punching out of the bottom are carried out simultaneously, and the outer cylindrical portion formed in the separating/punching step is diametrically expanded by the expander, so that the separating/punching step and the expanding step can be carried out continuously in a hot environment. Blanks for bearing rings can thus be manufactured with extremely high efficiency.

A roll former, which was necessary for cold rolling, is not necessary any longer according to the invention. This makes it possible to simplify the manufacturing facility and lower the cost.

During the expanding step, with the heated outer cylindrical portion eccentrically rotated, a punch for expansion is pressed into the outer cylindrical portion. The outer cylindrical portion can thus be expanded without cracking.

What is claimed is:

1. A method of forming blanks for bearing rings, comprising:

cutting a cylindrical article including an outer cylindrical portion and an inner cylindrical portion, the inner cylindrical portion having a bottom and having an end integrally joined to the outer cylindrical portion at a boundary line, wherein said cutting is along the boundary line so as to separate the outer cylindrical portion from the inner cylindrical portion such that the outer cylindrical portion has an inner diameter substantially equal to an outer diameter of the inner cylindrical portion and whereby no waste is produced;

punching the bottom of the inner cylindrical portion so as to remove the bottom and form the inner cylindrical portion into a blank for an inner bearing, wherein said punching of the bottom is performed simultaneously with said cutting of the cylindrical article; and forming the outer cylindrical portion into a blank for an outer bearing ring by diametrically expanding the outer cylindrical portion;

wherein said cutting, said punching, and said forming are continuously performed in a hot state.

2. The method of claim 1, wherein in said forming of the outer cylindrical portion, the outer cylindrical portion has a cylindrical outer surface having a uniform diameter along an axial direction of the outer cylindrical portion.

3. The method of claim 2, wherein in said forming of the outer cylindrical portion, the outer cylindrical portion has a first end tapered in a first direction and a second end opposite the first end, the second end also being tapered in the first direction.

4. The method of claim 2, wherein said cutting of the cylindrical article comprises:

positioning the cylindrical article in a fixed die assembly having a tubular punch; and moving a movable die assembly having a tubular punch toward the fixed die assembly, wherein the cylindrical article is cut along the boundary line by the tubular punch of the fixed die assembly and the tubular die of the movable die assembly so as to separate the outer cylindrical portion from the inner cylindrical portion; and wherein said simultaneous punching of the bottom of the inner cylindrical portion comprises punching the bottom of the inner cylindrical portion using an inner punch of the movable die assembly.

5. The method of claim 2, wherein said forming of the outer cylindrical portion into a blank comprises:

supporting the outer cylindrical portion in a hot state such that the outer cylindrical portion is immovable in an axial direction;

pressing a forming punch through the outer cylindrical portion so as to diametrically expand the outer cylindrical portion, wherein the forming punch has a tapered shaft portion and a straight shaft portion behind the tapered shaft portion.

6. The method of claim 2, wherein said forming of the outer cylindrical portion into a blank comprises:

inserting the outer cylindrical portion in a hot state into an eccentric hole in a front end of a rotary shaft, the eccentric hole having an inner periphery and a bottom;

moving a forming punch toward the rotating rotary shaft, the forming punch being coaxial with the rotary shaft and having a tip with a tapered shaft portion thereon;

inserting the tapered shaft portion of the forming punch into the outer cylindrical portion so as to bring the outer cylindrical portion into contact with the inner periphery and the bottom of the eccentric hole; and pressing the forming punch into the outer cylindrical portion while maintaining the contact between the outer cylindrical portion and the rotating rotary shaft, whereby a diameter of the outer cylindrical portion is increased.

7. The method of claim 1, wherein in said forming of the outer cylindrical portion, the outer cylindrical portion has a first end tapered in a first direction and a second end opposite the first end, the second end also being tapered in the first direction.

8. The method of claim 7,
wherein said cutting of the cylindrical article comprises:
positioning the cylindrical article in a fixed die assembly having a tubular punch; and
moving a movable die assembly having a tubular punch toward the fixed die assembly, wherein the cylindrical article is cut along the boundary line by the tubular punch of the fixed die assembly and the tubular die of the movable die assembly so as to separate the outer cylindrical portion from the inner cylindrical portion; and
wherein said simultaneous punching of the bottom of the inner cylindrical portion comprises punching the bottom of the inner cylindrical portion using an inner punch of the movable die assembly.

9. The method of claim 7, wherein said forming of the outer cylindrical portion into a blank comprises:
supporting the outer cylindrical portion in a hot state such that the outer cylindrical portion is immovable in an axial direction;
pressing a forming punch through the outer cylindrical portion so as to diametrically expand the outer cylindrical portion, wherein the forming punch has a tapered shaft portion and a straight shaft portion behind the tapered shaft portion.

10. The method of claim 7, wherein said forming of the outer cylindrical portion into a blank comprises:
inserting the outer cylindrical portion in a hot state into an eccentric hole in a front end of a rotary shaft, the eccentric hole having an inner periphery and a bottom;
moving a forming punch toward the rotating rotary shaft, the forming punch being coaxial with the rotary shaft and having a tip with a tapered shaft portion thereon;
inserting the tapered shaft portion of the forming punch into the outer cylindrical portion so as to bring the outer cylindrical portion into contact with the inner periphery and the bottom of the eccentric hole; and
pressing the forming punch into the outer cylindrical portion while maintaining the contact between the outer cylindrical portion and the rotating rotary shaft, whereby a diameter of the outer cylindrical portion is increased.

11. The method of claim 1,
wherein said cutting of the cylindrical article comprises:
positioning the cylindrical article in a fixed die assembly having a tubular punch; and
moving a movable die assembly having a tubular punch toward the fixed die assembly, wherein the cylindrical article is cut along the boundary line by the tubular punch of the fixed die assembly and the tubular die of the movable die assembly so as to separate the outer cylindrical portion from the inner cylindrical portion; and wherein said simultaneous punching of the bottom of the inner cylindrical portion comprises punching the bottom of the inner cylindrical portion using an inner punch of the movable die assembly.

12. The method of claim 11, wherein said forming of the outer cylindrical portion into a blank comprises:
supporting the outer cylindrical portion in a hot state such that the outer cylindrical portion is immovable in an axial direction;
pressing a forming punch through the outer cylindrical portion so as to diametrically expand the outer cylindrical portion, wherein the forming punch has a tapered shaft portion and a straight shaft portion behind the tapered shaft portion.

13. The method of claim 11, wherein said forming of the outer cylindrical portion into a blank comprises:
inserting the outer cylindrical portion in a hot state into an eccentric hole in a front end of a rotary shaft, the eccentric hole having an inner periphery and a bottom;
moving a forming punch toward the rotating rotary shaft, the forming punch being coaxial with the rotary shaft and having a tip with a tapered shaft portion thereon;
inserting the tapered shaft portion of the forming punch into the outer cylindrical portion so as to bring the outer cylindrical portion into contact with the inner periphery and the bottom of the eccentric hole; and
pressing the forming punch into the outer cylindrical portion while maintaining the contact between the outer cylindrical portion and the rotating rotary shaft, whereby a diameter of the outer cylindrical portion is increased.

14. The method of claim 1, wherein said forming of the outer cylindrical portion into a blank comprises:
supporting the outer cylindrical portion in a hot state such that the outer cylindrical portion is immovable in an axial direction;
pressing a forming punch through the outer cylindrical portion so as to diametrically expand the outer cylindrical portion, wherein the forming punch has a tapered shaft portion and a straight shaft portion behind the tapered shaft portion.

15. The method of claim 1, wherein said forming of the outer cylindrical portion into a blank comprises:
inserting the outer cylindrical portion in a hot state into an eccentric hole in a front end of a rotary shaft, the eccentric hole having an inner periphery and a bottom;
moving a forming punch toward the rotating rotary shaft, the forming punch being coaxial with the rotary shaft and having a tip with a tapered shaft portion thereon;
inserting the tapered shaft portion of the forming punch into the outer cylindrical portion so as to bring the outer cylindrical portion into contact with the inner periphery and the bottom of the eccentric hole; and
pressing the forming punch into the outer cylindrical portion while maintaining the contact between the outer cylindrical portion and the rotating rotary shaft, whereby a diameter of the outer cylindrical portion is increased.

16. The method of claim 1, wherein said cutting of the cylindrical article comprises:
positioning the cylindrical article on fixed tubular punch of a fixed die assembly; and
moving a movable die assembly having a movable tubular punch toward the fixed die assembly, wherein the fixed tubular punch has an outside diameter and the movable tubular punch has an inside diameter substantially equal to the outside diameter of the fixed tubular punch, the movable die assembly moving so as to slide the movable tubular punch over the fixed tubular punch, whereby the cylindrical article is cut along the boundary line.

17. A device for manufacturing blanks for bearing rings, comprising:

a separating/punching component for cutting a heated cylindrical article including an outer cylindrical portion and an inner cylindrical portion integrally connected to the outer cylindrical portion along a boundary line, wherein said separating/punching component is capable of cutting the cylindrical article along the boundary line so as to separate the outer cylindrical portion from the inner cylindrical portion such that the outer cylindrical portion has an inner diameter substantially equal to an outer diameter of the inner cylindrical portion, and simultaneously punching the cylindrical article so as to remove a bottom portion from said inner cylindrical portion, whereby the inner cylindrical portion is formed into a blank for an inner bearing; and a diameter-increasing component for expanding a diameter of the outer cylindrical portion separated from the inner cylindrical portion, whereby the outer cylindrical portion is formed into a blank for an outer bearing ring.

18. The device of claim 17, wherein said separating/punching component comprises:

a fixed die assembly including a die with a setting hole for retaining the cylindrical article, and a fixed tubular punch arranged in said die such that a tip of said fixed tubular punch fits in the outer cylindrical portion of the cylindrical article; and a movable die assembly including a movable tubular punch arranged to fit around said tip of said fixed tubular punch, and a movable inner punch for punching the bottom portion of the inner cylindrical portion, said movable inner punch being arranged in said movable tubular punch so as to be coaxial with said movable tubular punch.

19. The device of claim 18, wherein said movable tubular punch has an inside diameter, and said fixed tubular portion has an outside diameter substantially equal to said inside diameter of said movable tubular punch.

20. The device of claim 18, wherein said diameter-increasing component comprises:

a fixed die assembly including a die with a forming hole for retaining and forming an outer surface of the outer cylindrical portion by restricting an amount of diametrical expansion of the outer cylindrical portion; and a movable die assembly including a forming punch arranged coaxially with respect to said die of said fixed die assembly, said forming punch having a tapered shaft portion and a straight shaft portion contiguous with said tapered shaft portion for forming an inner surface of the outer cylindrical portion, wherein said movable die assembly is capable of moving towards and away from said fixed die assembly.

21. The device of claim 18, wherein said diameter-increasing component comprises:

a fixed die assembly including a rotary shaft, said rotary shaft having an end with an eccentric forming hole for retaining the outer cylindrical portion in a hot state; and a movable die assembly having a rotatable forming punch, said forming punch being coaxial with respect to said rotary shaft and having a tip with a tapered portion thereon and a straight portion contiguous with said tapered portion, said straight portion having a diameter equal to a diameter of an inner surface of a blank for an outer bearing ring, said rotary shaft being arranged such that said eccentric forming hole faces said forming punch and is capable of receiving said forming punch, and wherein said forming punch is capable of being pressed into the outer cylindrical portion retained in said eccentric forming hole such that the outer cylindrical portion contacts an inner surface of said eccentric forming hole and a bottom of said eccentric forming hole so as to be diametrically expanded and rotated;

wherein a minimum distance between said inner surface of said eccentric forming hole and an axis of said rotary shaft is substantially equal to a radius of an outer surface of a blank for an outer bearing ring.

22. The device of claim 17, wherein said diameter-increasing component comprises:

a fixed die assembly including a die with a forming hole for retaining and forming an outer surface of the outer cylindrical portion by restricting an amount of diametrical expansion of the outer cylindrical portion; and a movable die assembly including a forming punch arranged coaxially with respect to said die of said fixed die assembly, said forming punch having a tapered shaft portion and a straight shaft portion contiguous with said tapered shaft portion for forming an inner surface of the outer cylindrical portion, wherein said movable die assembly is capable of moving towards and away from said fixed die assembly.

23. The device of claim 17, wherein said diameter-increasing component comprises:

a fixed die assembly including a rotary shaft, said rotary shaft having an end with an eccentric forming hole for retaining the outer cylindrical portion in a hot state; and a movable die assembly having a rotatable forming punch, said forming punch being coaxial with respect to said rotary shaft and having a tip with a tapered portion thereon and a straight portion contiguous with said tapered portion, said straight portion having a diameter equal to a diameter of an inner surface of a blank for an outer bearing ring, said rotary shaft being arranged such that said eccentric forming hole faces said forming punch and is capable of receiving said forming punch, and wherein said forming punch is capable of being pressed into the outer cylindrical portion retained in said eccentric forming hole such that the outer cylindrical portion contacts an inner surface of said eccentric forming hole and a bottom of said eccentric forming hole so as to be diametrically expanded and rotated;

wherein a minimum distance between said inner surface of said eccentric forming hole and an axis of said rotary shaft is substantially equal to a radius of an outer surface of a blank for an outer bearing ring.

* * * * *